(12) United States Patent
Nagashima et al.

(10) Patent No.: US 6,918,451 B2
(45) Date of Patent: Jul. 19, 2005

(54) BRAKE BAND AND PORTABLE TRIMMER

(75) Inventors: Akira Nagashima, Kawasaki (JP);
Tamotsu Ueda, Sagamihara (JP);
Shunsuke Nakadate, Hamura (JP);
Kazuya Hanada, Hino (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 10/409,135

(22) Filed: Apr. 9, 2003

(65) Prior Publication Data

US 2003/0192188 A1 Oct. 16, 2003

(30) Foreign Application Priority Data

| Apr. 11, 2002 | (JP) | ........................................ 2002-109222 |
| Oct. 9, 2002 | (JP) | ........................................ 2002-296612 |
| Oct. 9, 2002 | (JP) | ........................................ 2002-296613 |

(51) Int. Cl.$^7$ ............................ F16D 49/00; F16D 65/06
(52) U.S. Cl. ........................ 173/221; 30/276; 188/77 R; 192/17 R
(58) Field of Search ........................ 173/221; 192/17 R, 192/107 T; 188/77 R; 30/276

(56) References Cited

U.S. PATENT DOCUMENTS

| 4,006,528 | A | * | 2/1977 | Katsuya | ........................ 30/276 |
| 4,044,533 | A | * | 8/1977 | Wick | ........................... 56/11.3 |
| 4,279,117 | A | * | 7/1981 | Lawrence et al. | ............ 56/11.3 |
| 4,299,141 | A | * | 11/1981 | Fairchild | ..................... 475/121 |
| 4,324,045 | A | * | 4/1982 | Hoppner et al. | ............... 30/381 |
| 4,326,368 | A | * | 4/1982 | Hoff | ............................. 56/11.3 |
| 4,384,637 | A | * | 5/1983 | Runkle | ..................... 188/77 R |
| 4,696,381 | A | * | 9/1987 | Johnson, Sr. | .............. 192/17 R |
| 5,921,355 | A | * | 7/1999 | Mostrom | .................. 188/77 W |
| 5,947,866 | A | * | 9/1999 | Nagashima | .................. 477/200 |
| 6,167,973 | B1 | * | 1/2001 | Nagashima | .................. 173/221 |

FOREIGN PATENT DOCUMENTS

| JP | 51-63222 | 6/1976 |
| JP | 52-12089 | 4/1977 |
| JP | 54-1374 | 1/1979 |
| JP | 54-40954 | 3/1979 |
| JP | 11-196648 | 7/1999 |
| JP | 2002-176822 | 6/2002 |

* cited by examiner

*Primary Examiner*—Rinaldl I. Rada
*Assistant Examiner*—Gloria R. Weeks
(74) *Attorney, Agent, or Firm*—Nixon Peabody LLP; Donald R. Studebaker

(57) ABSTRACT

The present invention relates to a brake band for use with a centrifugal clutch. The brake band is formed in a curved strip shape to be disposed along the outer peripheral surface of a clutch drum of the centrifugal clutch, and is adapted to be tightened around or released from the outer peripheral surface in response to the movement of at least one end of the brake band. The brake band comprises a plurality of linings provided on the inner surface thereof to be opposed the outer peripheral surface of the clutch drum. The linings are located spaced apart from each other along the longitudinal direction of the brake band.

5 Claims, 9 Drawing Sheets

BRAKE BAND AND PORTABLE TRIMMER

FIELD OF THE INVENTION

The present invention relates to a trimmer for cutting grasses or the like, and more particularly to a trimmer equipped with an internal combustion engine, a cutter blade, wherein a driveline between the internal combustion engine and the cutter blade includes a centrifugal clutch having a clutch drum, and a brake mechanism operable to brake the rotation of the clutch drum during non-operation periods to prevent the power transfer from the engine to the cutter blade and the idle running of the cutter blade.

BACKGROUND OF THE INVENTION

Generally, a trimmer employs a drive mechanism for transferring the rotation of an internal combustion engine through a centrifugal clutch. For example, Japanese Patent Laid-open Publication No. Hei 11-196648 discloses a portable trimmer comprising a centrifugal clutch provided with a brake mechanism for preventing a cutter blade from unintentionally rotating when an operator discontinues a trimming operation. This brake mechanism includes a brake band disposed along the outer peripheral surface of a clutch drum of the centrifugal clutch. During the initial start-up of the internal combustion engine, the brake band is located at a clamp position where it is pressed against the outer peripheral surface so as to tighten the outer peripheral surface to brake the rotation of the clutch drum. A brake control lever can be operated to move the brake band to a release position where the tightening force of the brake band is released to allow the clutch drum to be rotated so that the cutter blade is rotatably driven.

More specifically, the above brake mechanism comprises the brake band disposed along the outer peripheral surface of the clutch drum, and releasing means for releasing the brake band. The releasing means includes a swingable member biased toward its initial position by a spring, and a control wire having one end connected to the swingable member and the other end connected operationally to the brake control lever. The brake band has one end fixed to a housing and the other end connected to the swingable member. The brake control lever can be operated to pull the swingable member against the spring force of the spring or swing the swingable member from the initial position to its swing position so as to move the brake band from the tightened position to the release position.

In addition to the above patent publication, various brake mechanisms of the centrifugal clutch are disclosed, for example, in Japanese Patent Laid-open Publication No. Sho 51-63222, Japanese Patent Publication No. Sho 52-12089, Japanese Utility Model Publication No. Sho 54-1374 and Japanese Patent Laid-open Publication No. Sho 54-40954. These brake mechanisms commonly include a brake lining attached over an effective contact length of the inner surface of a brake band on its entirety. Further, Japanese Patent Laid-open Publication No. 2002-176822 discloses another type brake mechanism including a pair of swingable brake members for pressing the above clutch drum from both sides thereof, as a substitute for a brake band.

However, taking the brake mechanism disclosed in the aforementioned Japanese Patent Laid-Open Publication No. Hei 11-196648 as an example, the outer periphery of the clutch drum can be undesirably worn out in an early stage depending on its use conditions, because a braking force for the clutch drum is obtained by tightening its outer peripheral surface with the brake band. In addition, the brake mechanisms using a brake band generally involve a problem of abnormal noises.

For example, as shown in FIG. 1, a conventional trimmer 2 comprises an internal combustion engine 4 of a small air-cooled 2-cycle or 4-cycle gasoline engine, an operation rod 6 extending forwardly from the engine 4, a cutting blade 8 attached to the front end of the operation rod 6 through a gear case 7, and a handle 10 with a brake control lever 20 attached to an intermediate region of the operation rod 6. The trimmer 2 includes a driveline comprised of a centrifugal clutch (not shown) for transferring the rotation of the engine 4, an output shaft 14 extending from the centrifugal clutch along the inner space of the operation rod 6, and the cutting blade 8 connected to the output shaft 14 through the gear case 7.

Given that the centrifugal clutch is provided with the aforementioned brake mechanism having the brake band, upon the release of the brake band, the power of the engine 4 is transferred to the cutter blade 8 through the driveline to rotate the cutter blade 8. When the brake control lever 20 is released to discontinue a trimming operation, the outer peripheral surface of the clutch drum is tightened and braked by the brake band to stop the rotation of the output shaft 14, while the cutter blade 8 tends to keep rotating according to inertia force. As a result, an abnormal noise will be generated from the bear box 7 interposed between the stopped output shaft 14 and the cutter blade 8 which is continuously rotating.

While the rotation of the clutch drum is usually stopped by a tightening force of the brake band, deficiency in the clamping force will result in slippage of the clutch drum and allow the clutch drum to rotate, which leads to difficulty in eliminating the idle running of the cutter blade within a given time. On the other hand, excess in the tightening force will cause too hasty stop of the clutch drum, which leads to unendurable reaction force against operator's hands, abnormal noises due to interference between gears provided in the driveline, damage in associated components, or looseness in the fixing of the cutting blade. Thus, it is desired to set the tightening force of the brake band against the clutch drum at an adequate value.

SUMMARY OF THE INVENTION

In view of the above circumstances, it is therefore an object of the present invention to provide a brake band capable of preventing premature wearing and abnormal noise in a clutch drum.

It is another object of the present invention to provide a trimmer capable of adjusting a tightening force of a brake band against a clutch drum.

In order to achieve the above object, according a first aspect of the present invention, there is provided a brake band for use with a centrifugal clutch. The brake band is formed in a curved strip shape to be disposed along the outer peripheral surface of a clutch drum of the centrifugal clutch, and is adapted to be tightened around or released from the outer peripheral surface in response to the movement of at least one end of the brake band. The brake band comprises a plurality of linings provided on the inner surface thereof to be opposed the outer peripheral surface of the clutch drum. The linings are located spaced apart from each other along the longitudinal direction of the brake band.

According to the present invention, the linings provided at spaced-apart intervals can prevent premature wearing in the clutch drum. In addition, when the brake band is operated to brake the rotation of the clutch drum, an adequate slippage can be generated between the linings and the outer peripheral surface of the clutch drum to prevent hasty stop of associated movable members. Thus, the brake band to be incorporated in a brake mechanism for a trimmer can keep an output shaft connected to the clutch drum from hasty stop so as to suppress the interference between gears in a gear case provided between the output shaft and the cutting blade which tends to keep rotating according to inertia force to prevent abnormal noises from occurring.

Further, in the present invention, instead of providing a lining over the inner surface of the brake band in its entirety, the plurality of linings are located spaced apart from each other in the longitudinal direction of the brake band. Thus, the adequate slippage of the clutch drum during the operation of tightening the outer peripheral surface of the clutch drum by the brake band can prevent abnormal noises otherwise caused around the brake band. This phenomenon was newly founded by the inventors. That is, in various researches for achieving the above object, the inventors found that when the lining was provided over the inner surface of the brake band in its entirety, abnormal noises were apt to generate around the brake band. Based on this knowledge, the inventors have finally solved this problem by the above feature of the present invention.

In a specific embodiment of the present invention, in a position where the brake band is disposed along the outer peripheral surface of the clutch drum, the linings may be located in the regions of 90°, 180° and 270°, respectively, in a rotational direction of the clutch drum with respect to a line connecting the rotational center of the clutch drum and the midpoint between the ends of the brake band. In this case, when the brake band is relaxed by increasing the distance between the ends of the brake band or tightened by reducing the distance therebetween, the lining can be effectively pressed against the outer peripheral surface of the clutch drum of the centrifugal clutch to brake the clutch drum while prevent abnormal noises from occurring.

In another embodiment of the present invention, the total length of the linings may be approximately one third of the effective contact length of the brake band. In this case, abnormal noises to be caused between the clutch drum and the linings can be more reliably prevented.

DESCRIPTION OF THE PREFERRED EMBODIMENT

With reference to accompanying drawings, a brake band and portable trimmers including the brake band according to various embodiments of the present invention will now be described.

Figure 1:
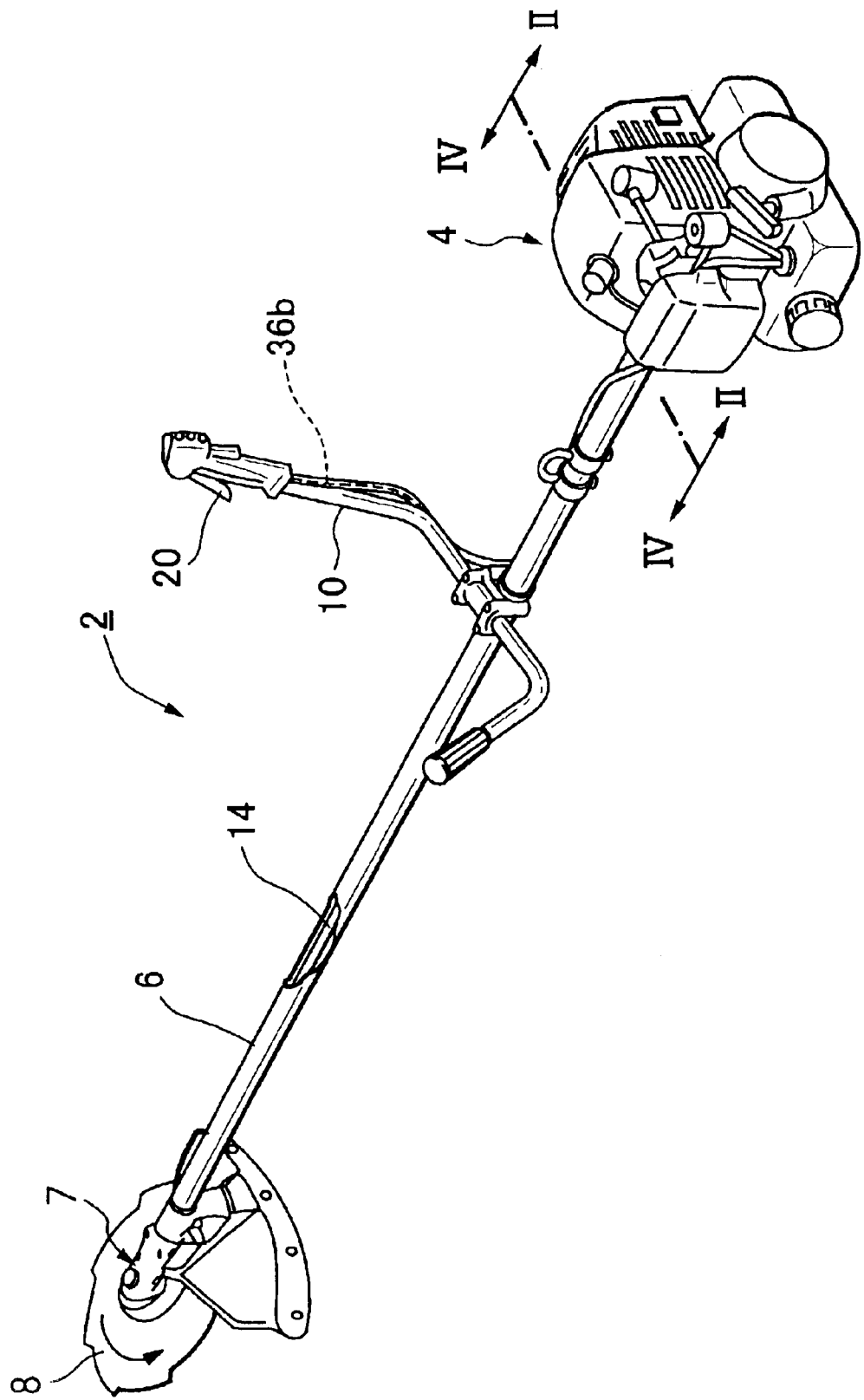
FIG. 1 is a partially cut-out perspective view showing of the exterior of a trimmer according to a first or second embodiment of the present invention.

A portable trimmer according to a first embodiment of the present invention has generally the same structure as that of the conventional trimmer 2 as shown in FIG. 1 except for a brake band. Thus, in the first embodiment, the same components or elements as those of the conventional trimmer are defined by the same reference numerals, and their detailed description will be omitted.

Figure 2:
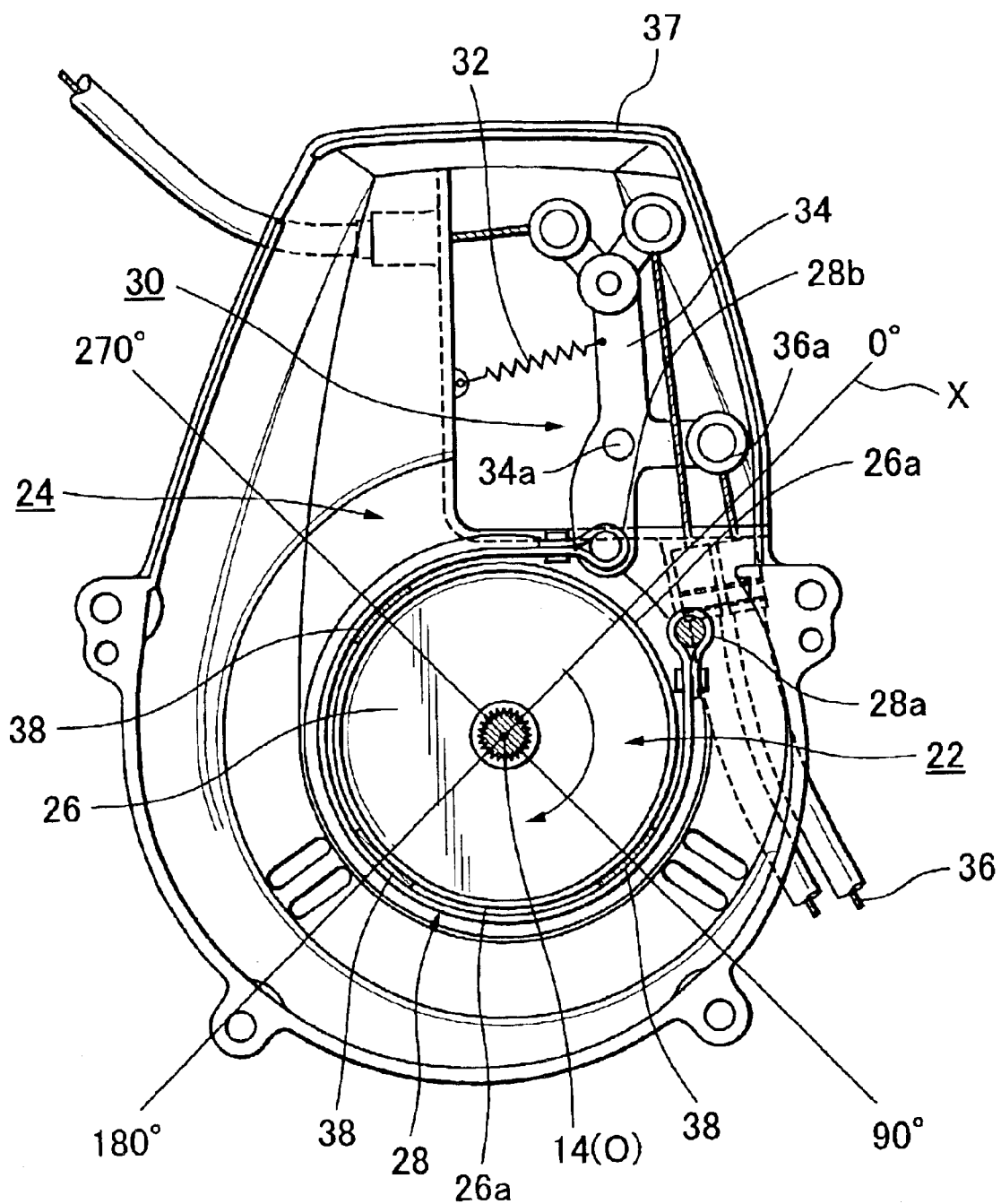
FIG. 2 is a sectional view of the main body of the trimmer according to the first embodiment, taken along the line II—II in FIG. 1.

As shown in FIG. 2, the trimmer according to the first embodiment of the present invention comprises a centrifugal clutch 22 provided between a crankshaft (not shown) and an internal combustion engine 4 and an output shaft 14, and a brake mechanism 24 for braking the centrifugal clutch 22.

The brake mechanism 24 includes a brake band 28 disposed along the outer peripheral surface 26a of a clutch drum 26 of the centrifugal clutch 22, and a releasing device 30 for releasing the brake band 28. The releasing device 30 includes a swingable member 34 having a pivot axis 34a. The swingable member 34 is biased by a tension spring 32 toward its initial (braking) position (shown by a solid line in FIG. 2), and connected with one end 36a of a wire 36. The other end 36b of the wire 36 is operationally connected to a brake control lever 20. The brake band 28 has a first end 28a engaged with a housing 37 of the engine 4, and a second end 28b connected to the swingable member 34.

Figure 3:
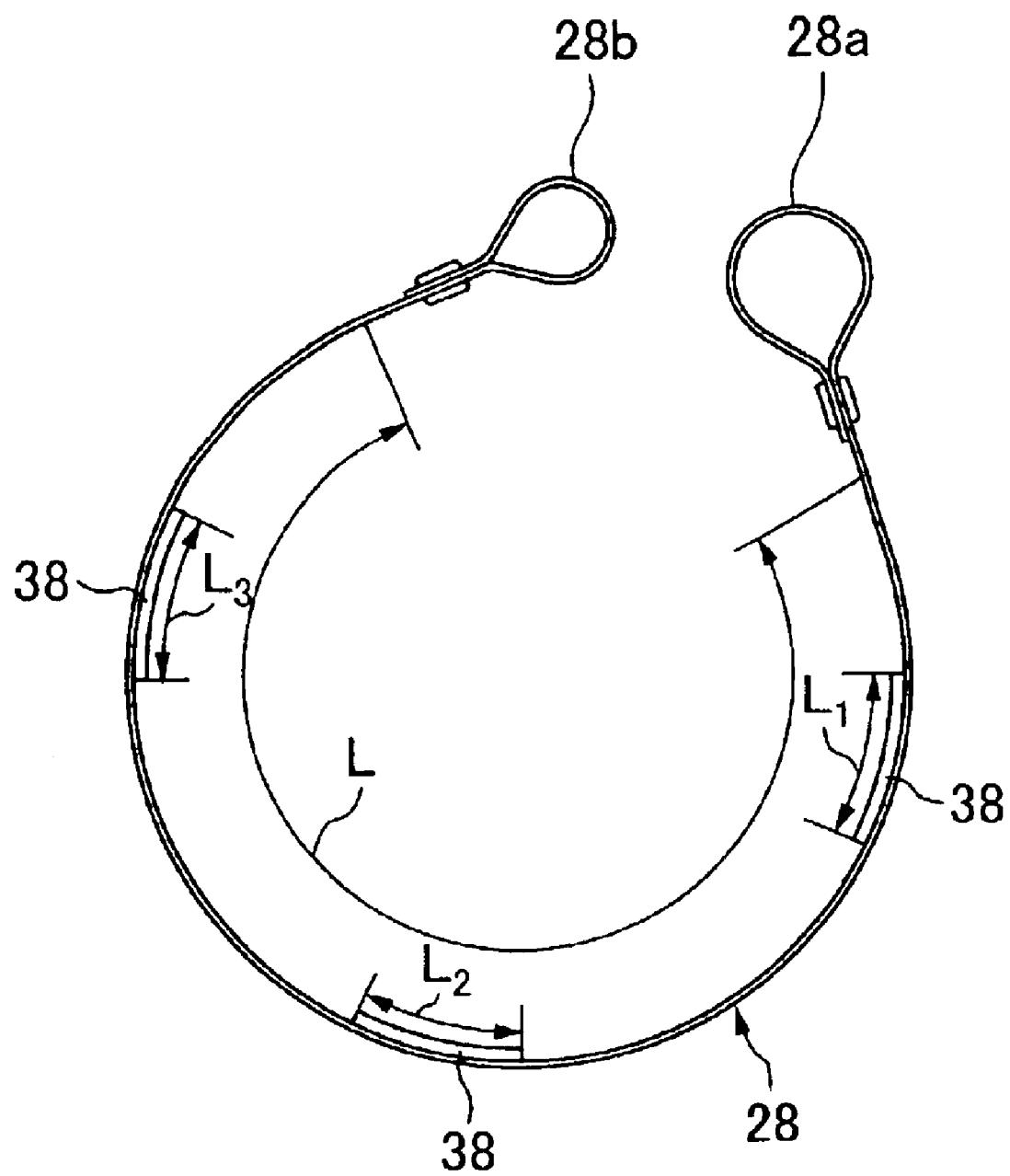
FIG. 3 is a front view showing a brake band in the trimmer according to the first embodiment.

As seen in FIG. 3, the brake band 28 includes a plurality of linings 38 provided on the inner surface thereof opposed to the outer peripheral surface 26a of the clutch drum 26. The linings 38 are located spaced apart from each other along the longitudinal direction of the brake band 28. More specifically, the brake band 28 is provided with three linings 38 form by dividing a single lining martial having a length approximately one third of the effective contact length of the brake band 28 into three having lengths L1, L2 and L3, respectively. As shown in FIG. 2, in a position where the brake band 28 is disposed along the outer peripheral surface of the clutch drum 26, the three linings 38 are located in the regions of 90°, 180° and 270°, respectively, in a rotational direction of the clutch drum 26, with respect to the line X connecting the rotational center O of the clutch drum 26 and the midpoint between the ends 28a, 28b of the brake band 28 (or on the assumption that 0 (zero) degree is defined by the line X). More specifically, the linings 38 are positioned to extend on the both sides of the lines at angles 90°, 180° and 270° with the line X, respectively. Each of the linings has the same width as that of the brake band 28.

Each of the linings 38 is made of a lining material with given properties. The lining material is divided into three to form three rectangular linings 38 each having a given length and thickness as described above, and the linings 38 are attached onto the inner surface of the brake band 28.

The brake mechanism 24 including the brake band 28 in the trimmer according to the first embodiment is operated as follows.

In an initial state as shown in FIG. 2, the brake band 28 is clamped to the outer peripheral surface 26a of the clutch drum 26 (clamp position) according to the swingable member 34 biased by the spring 32 (initial position). Even if the engine is started in this position, no power is transferred to the cutting blade 8 because the clutch drum 26 is braked by the brake band 28, and the cutting blade 8 is still stopped.

When an operator grips the brake control lever 20, the swingable member 34 is pulled against the spring force of the tension spring 32 through the wire 36, and moved from the initial position to a swing position. Thus, the second end 28b of the brake band 28 gets away from the first end 28a. That is, the brake band 28 is moved from the braking position to a non-braking position to release the braking of the clutch drum 26. In this way, the engine power is transferred to the cutting blade 8 through a driveline comprised of the centrifugal clutch 22, the output shaft 14, and the cutting blade 8, to rotate the cutting blade 8.

When the operator releases the brake control lever 20 to discontinue a trimming operation of cutting grasses, the wire 36 is loosened to allow the swingable member 34 to be returned to the initial position by the spring force of the tension spring 32. Thus, the second end 28a of the brake band 28 is moved toward the first end 28a so as to tighten the brake band 28 to allow the linings 38 to be pressed against the outer peripheral surface 26a of the clutch drum 26. During this operation, the three linings 38 are pressed onto the outer peripheral surface 26a of the clutch drum 26 from the side closer to the second end 28b moved by the swingable member 34, or in the positional order of 270°, 180° and 90°, with time lags.

In this way, the clutch drum 26 will be completely stopped within a predetermined time (e.g. 4 seconds) while generating an adequate slippage between the clutch drum 26 and the linings 38. While the cutter blade 8 tends to keep rotating, the output shaft 14 connected to the clutch drum 26 is not stopped in a hasty manner. Thus, the interference between gears of a gear box 7 interposed between the output shaft 14 and the cutter blade 8 is suppressed to prevent abnormal noises from occurring.

As above, differently from a lining provided over the brake band 28 in its entirety, the separated three linings 38 are pressed against the outer peripheral surface 26a of the clutch drum 26 one by one, and the resulting slippage therebetween effectively prevents abnormal noises from occurring.

Figure 4:
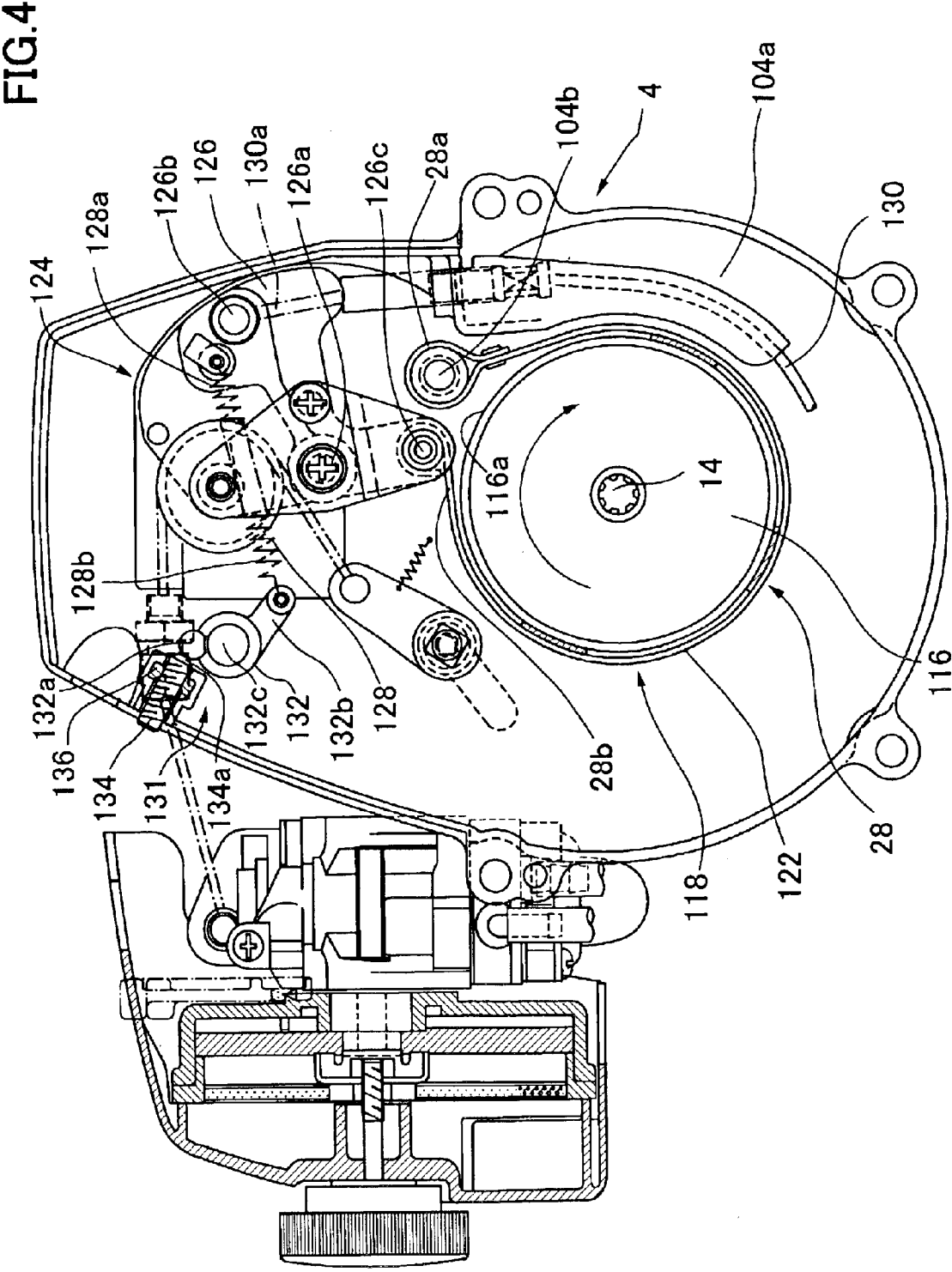
FIG. 4 is a sectional view showing a centrifugal clutch and a brake mechanism in the trimmer according to the second embodiment, taken along the line IV—IV in FIG. 1, wherein the centrifugal clutch is braked by the brake mechanism.
Figure 5:
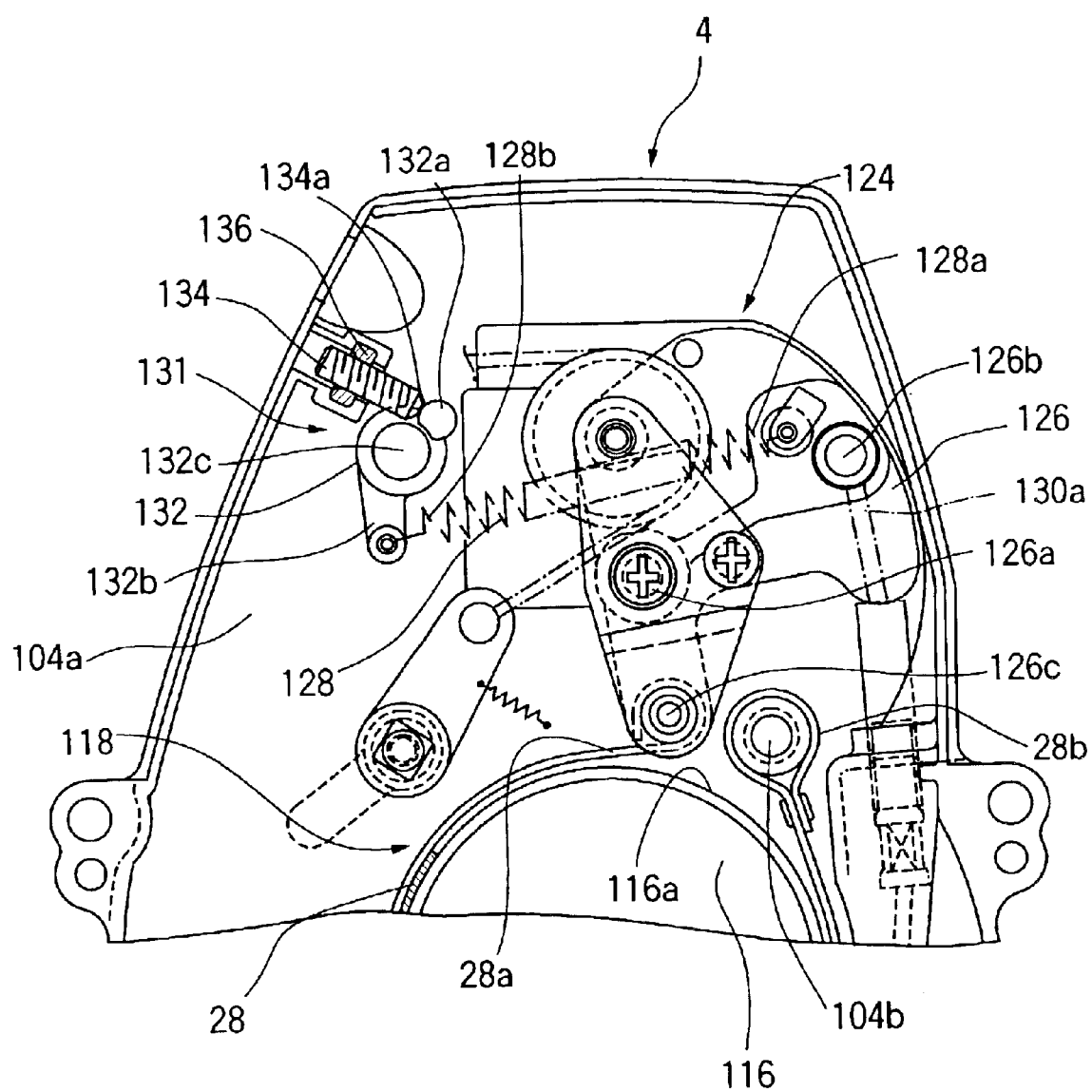
FIG. 5 is a fragmentary enlarged view showing an adjusting device for adjusting the tightening force of a brake band in FIG. 4.

With reference to FIGS. 1, 4 and 5, a trimmer according to a second embodiment of the present invention will be described below. The trimmer according to the second embodiment has generally the same structure as that of the conventional trimmer 2 as shown in FIG. 1 except for a braking mechanism. Thus, in the second embodiment, the same components or elements as those of the conventional trimmer are defined by the same reference numerals, and their detailed description will be omitted. A centrifugal clutch 112 including a clutch drum 116 is provided in a driveline between an internal combustion engine 4 and a cutter blade 8. In order to provide enhanced safety during initial start up of the trimmer according to the second embodiment, a brake mechanism 118 is provided to prevent lost motion in the cutting blade 2 during non-operation periods, as shown in FIG. 4. The braking mechanism 118 can be released by gripping a brake control lever 20 as shown in FIG. 1. When an operator unlinks the brake control lever 20, the brake mechanism 118 brakes the rotation of the clutch drum 116 to prevent the cutting blade from unintentionally rotating.

As shown in FIG. 4, the braking mechanism 118 comprises a brake band 28 disposed along the outer peripheral surface 116a of the clutch drum 116, and a releasing device 124 for releasing the brake band 28. The releasing device 124 includes a first swingable member 126 biased toward its initial (braking) position as shown in FIG. 4 by a tension spring 128 having a proximal end 128a connected thereof. The first swingable member 126 is connected to the brake control lever 20 through a cable 130, and adapted to be moved against the spring force of the tension spring 128 from the initial position to its swing position (not shown) by the brake control lever 20. The cable 130 has one end 130a connected to a first fixing position 126b located radially outward from a pivot axis 126a of the first swingable member 126.

The brake band 28 has one end 28b connected to a second fixing point 126c located radially inward from the pivot axis 126a while defining a given interior angle between the first and second fixing positions 126b, 126c about the pivot axis 126a. The other end of the brake band 28 is engaged with a housing 104 surrounding the engine 4 through a pin 104. When the first swingable member 126 is in the initial position (the position as shown in FIG. 4), the brake band 28 is clamped to the outer surface 116a of the clutch drum 116. The brake band 28 is relaxed by operating the brake control lever 20 to move the first swingable member to the swing position.

The braking mechanism 118 further includes an adjusting device 131 for adjusting the clamping force of the brake band 28 against the clutch drum. The adjusting device 131 has a distal-end-position adjusting member 132 connected with the distal end 128b of the tension spring 128 located on the opposite side of the proximal end 128a attached to the first swingable member 126, and a push screw 134 for moving the distal-end-position adjusting member 132 in a direction causing increased or reduced tension of the tension spring 128. A fastening force of the brake band 28 against the clutch drum 116 is determined by the pulling force of the tension spring 128, and the pulling force of the tension spring 128 is adjusted by the adjusting device 131. Thus, the adjusting device 131 can adjust the fastening force of the brake band 28. In the second embodiment, the distal-end-position adjusting member 132 is composed of a second swingable member 132 having a first arm portion 132a and a second arm portion 132b extending from the pivot axis 132c of the second swingable member 132 to define a given angle therebetween about the pivot axis 132c. More specifically, the second swingable member 132 includes the first arm portion 132a composed of a semicircular portion protruding radially outward from the pivot axis, and the second arm portion 132b extending outward to define a given interior angle with the first arm portions 132a, and having a length from the pivot axis 132c greater than that of the first arm portion 132a. The distal end 128b of the tension spring 128 is connected to the top end of the second arm portion 132b.

The push screw 134 and the first arm portion 132a are appropriately arranged such that the longitudinal axis (force-acting line) of the push screw 134 of the adjusting device 131 defines a given angle with the center axis (moment axis) of the first arm 132a radially outward from the pivot axis 132c. The screw 134 has an edge 134a in contact with the arc-shaped outer peripheral surface of the first arm portion 132a. The distance between the pivot axis 132c and the force-acting point (edge 134a) of the push screw 134 is shorter than the distance between the pivot axis 132c and the position where the tension spring 128 is connected to the second arm portion.

The push screw 134 has a head portion exposed to the outside of the housing 104a, and the top surface of the head portion is formed with a concave portion, such as a groove or hole having an appropriate shape, for receiving therein a tool for turning the push screw 134. Preferably, the concave portion is formed in any shape other than concave portions of standard screws defined in JIS or the like to assure so-called "tamper proof". That is, the concave portion preferably has a shape for preventing any standard tool for turning the standard screws from being inserted therein or from rotating the push screw 134 even if inserted. In this case, it is necessary to prepare a special tool capable of fitting in the concave portion having a particular shape. In order to prevent loosening in the push screw 134 due to vibration during the trimming operation or the like, the push screw 134 is screwed or penetratingly inserted into a polygonal anti-rotation nut member 136 made of appropriate synthetic resin in such manner as a self-tapping screw.

The centrifugal clutch 112, the brake mechanism 118 and the releasing device 124 of the trimmer according to the second embodiment is operated as follows.

An operation of releasing the brake mechanism in the braking position as shown in FIG. 4 will first be described. When an operator grips the brake control lever 20, the cable 130 is stretched so that the first swingable member 126 is pulled against the pulling force of the tension spring 128, and moved clockwise from the initial position to a swing position (not shown). Thus, the brake band 28 is relaxed to allow the clutch drum 116 to be rotated, and the rotation of the engine 4 is transferred through the driveline to rotate the cutter blade 8.

When the operator releases the brake control lever 20, the first swingable member 126 is returned from the swing position to the initial position by the biasing force of the tension spring 128. Thus, the clutch drum 116 is clamped and braked by the brake band 28.

With reference to FIGS. 4 and 5, the adjusting device will be described below. A special tool is fitted in the concave portion of the push screw 134 to turn the push screw 134. If it is necessary to increase the tightening force of the brake band 28, the screw 134 can be forward driven. The driven screw 134 pushes the first arm portion 132a of the second swingable member 132 to rotate the second swingable member 132 clockwise. Simultaneously, the position of the distal end 128b of the tension spring 128 is moved in a direction causing increased tension of the tension spring 128 by the second arm portion 132b. That is, the pulling force of the tension spring 128 to the first swingable member 126 is increased to provide an increased clamping force of the brake band 28. If it is necessary to reduce the tightening force of the brake band 28, it can be achieved by reversely turning the screw.

According to the second embodiment, the adjusting device 131 is employed to allow the tightening force of the brake band 28 against the clutch drum 116 to be adjusted. Thus, the clutch drum 116 can be braked with a desired braking force and within a desired time. In addition, even if some looseness of the brake band 28 is caused by wearing or the like, the clamping force can be readily adjusted to stably operate the brake band with an adequate tightening force.

The second embodiment also has the following features. The distal-end-position adjusting member 132 is composed of the second swingable member 132 having the first and second arm portions 132a, 132b each extending from the pivot axis 132c thereof. The edge of the screw 134 acts on the first arm portion 132a, and the distal end 128b of the spring 128 is connected to the second arm portion 132b. The distance between the pivot axis 132c and the acting point of the screw 134 is shorter than the distance between the pivot axis 132c and the position where the spring 128 is connected to the second arm portion 132. Thus, the tension of the spring can be increased or reduced in a more wide range to facilitate adjusting the tightening force of the brake band 28.

Further, in the second embodiment, the edge of the screw 134 is in contact with the second arm portion 132b at the acting point, and the second swingable member 132 has an arc-shaped surface to be in contact with the edge of the screw 134 during the swing movement of the second swingable member 132. Thus, the second swingable member can be smoothly swung by turning the screw 134 forward or rearward.

Furthermore, according to the second embodiment, the screw 134 is configured to be turned only by a special tool so as to prevent improper operations.

Additionally, the anti-rotation nut member 136 can prevent the push screw 134 from loosening due to vibration or the like.

A portable trimmer according to a third embodiment will be described below. In this embodiment, the same components or elements as those of the first and second embodiments are defined by the same reference numerals, and their detailed description will be omitted.

Figure 6:
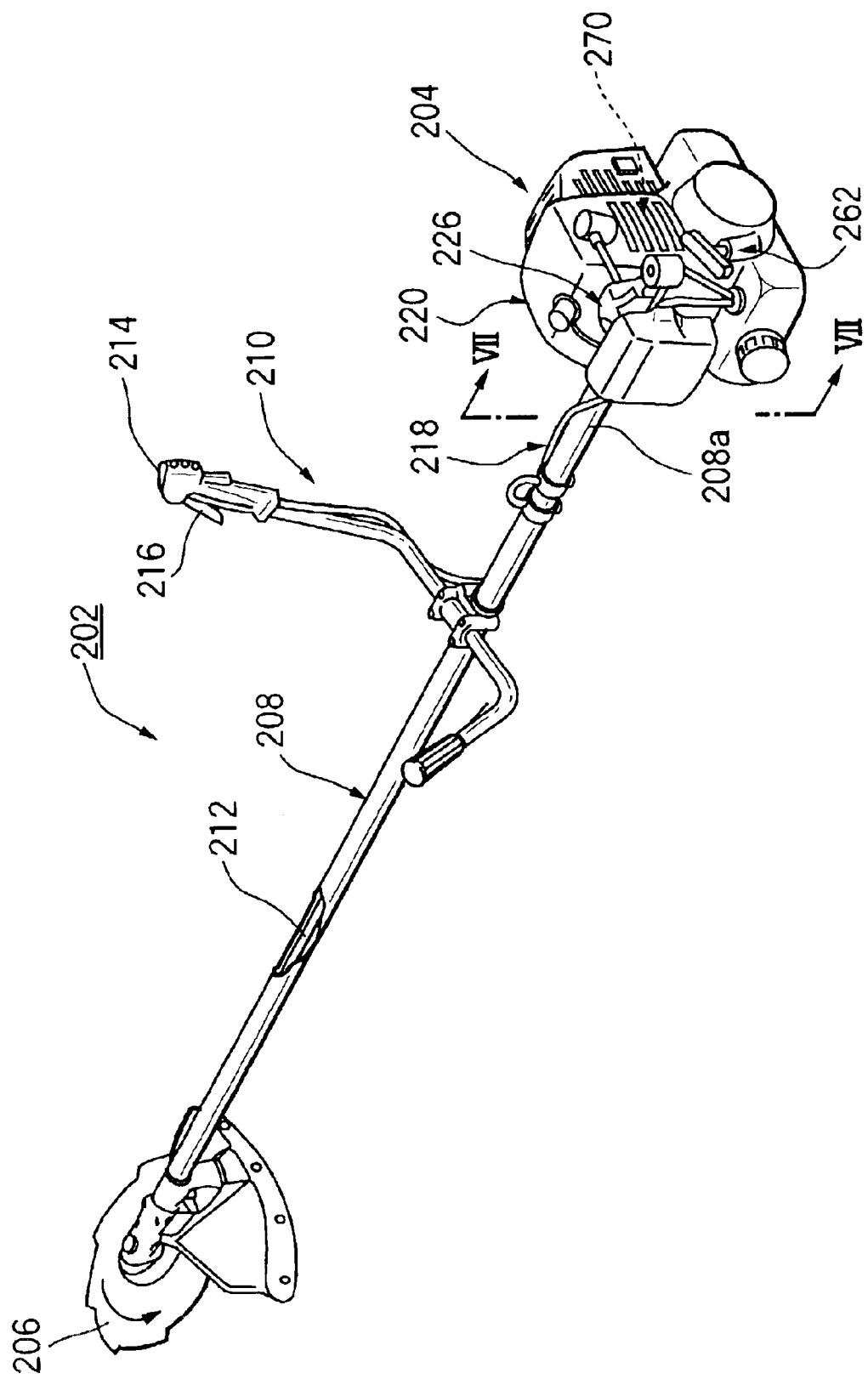
FIG. 6 is a partially cut-out perspective view showing of the exterior of a trimmer according to a third embodiment of the present invention.
Figure 7:
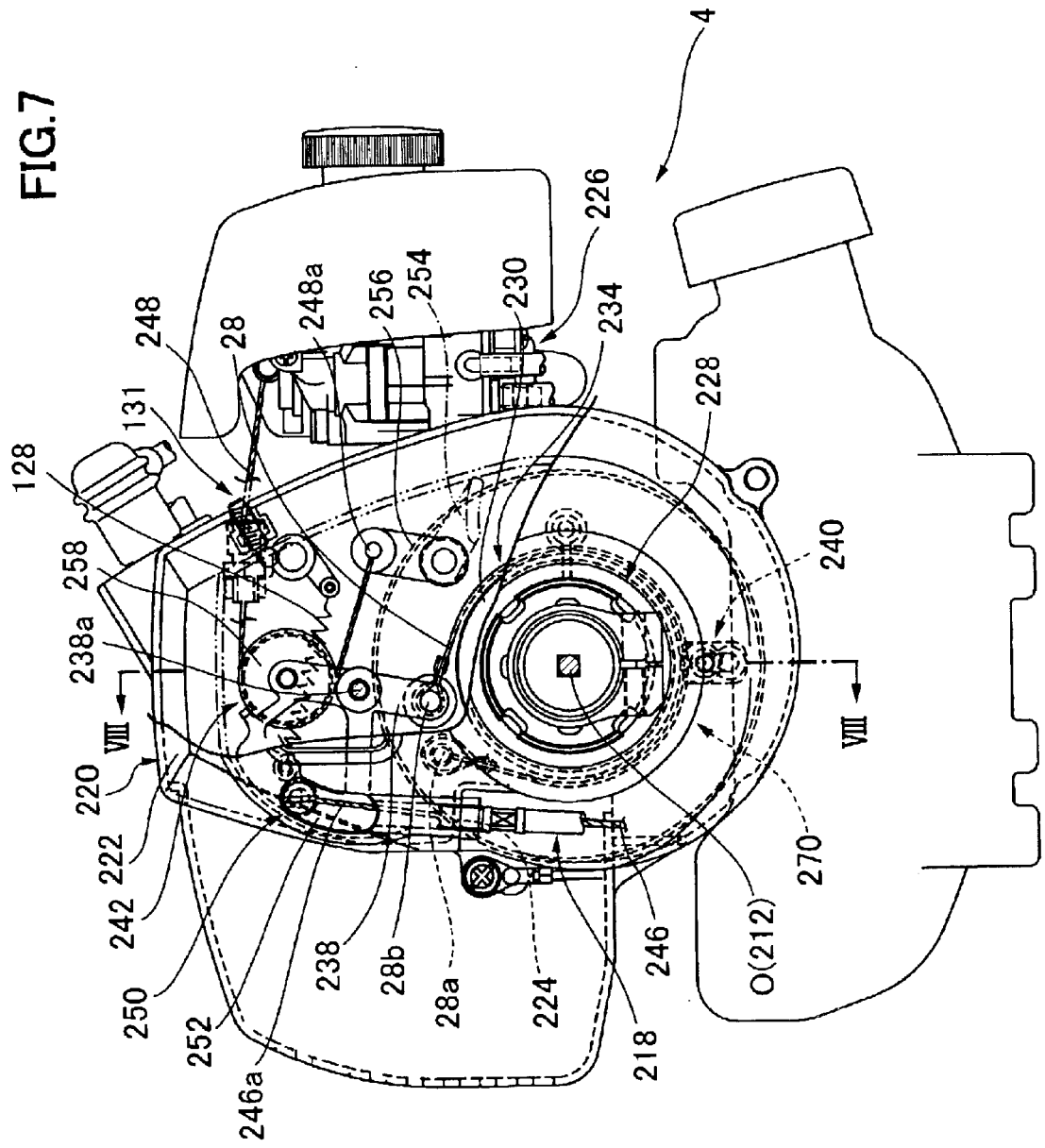
FIG. 7 is a partially cut-out front view showing a power unit section, taken along the line VII—VII in FIG. 6.

As shown in FIG. 6, the trimmer 202 according to the third embodiment of the present invention comprises a power unit 204 provided at the rear end thereof, a cutter blade 206 provided rotatably at the front end thereof, an operation rod 208 extending straightly between the power unit 204 and the cutting blade 206, and a U-shaped handle 210 attached to in the intermediate region of the operation rod 208. An internal combustion engine 270, or a small air-cooled 2-cycle or 4-cycle gasoline engine, is enclosed in a housing 220 of the power unit 204. A transfer shaft 212 extends along the inner space of the operation rod 208 to transfer the rotation of a crankshaft 270a of the engine 270 to the cutting blade 206. The handle 210 includes a right grip portion 214 provided with a throttle control lever 216. The throttle control lever 216 is connected to a throttle valve (not shown) of a carburetor 226 of the engine 270 through a wire member (Bowden cable) 218. As shown in FIGS. 6 and 7, the wire member 218 extends along the outside of the operation rod 8 to the power unit 204. Further, the wire member 218 extends to the inside of the housing 220 through a hole 224 formed in a fun cover 222 on the front side of the housing 220 of the power unit 204 and then to the throttle valve of the carburetor 226. When viewing in a direction parallel to the rotational axis O of the transfer shaft 212, or in FIG. 7, the carburetor 226 is located above or on the side of the transfer shaft 212.

Figure 8:
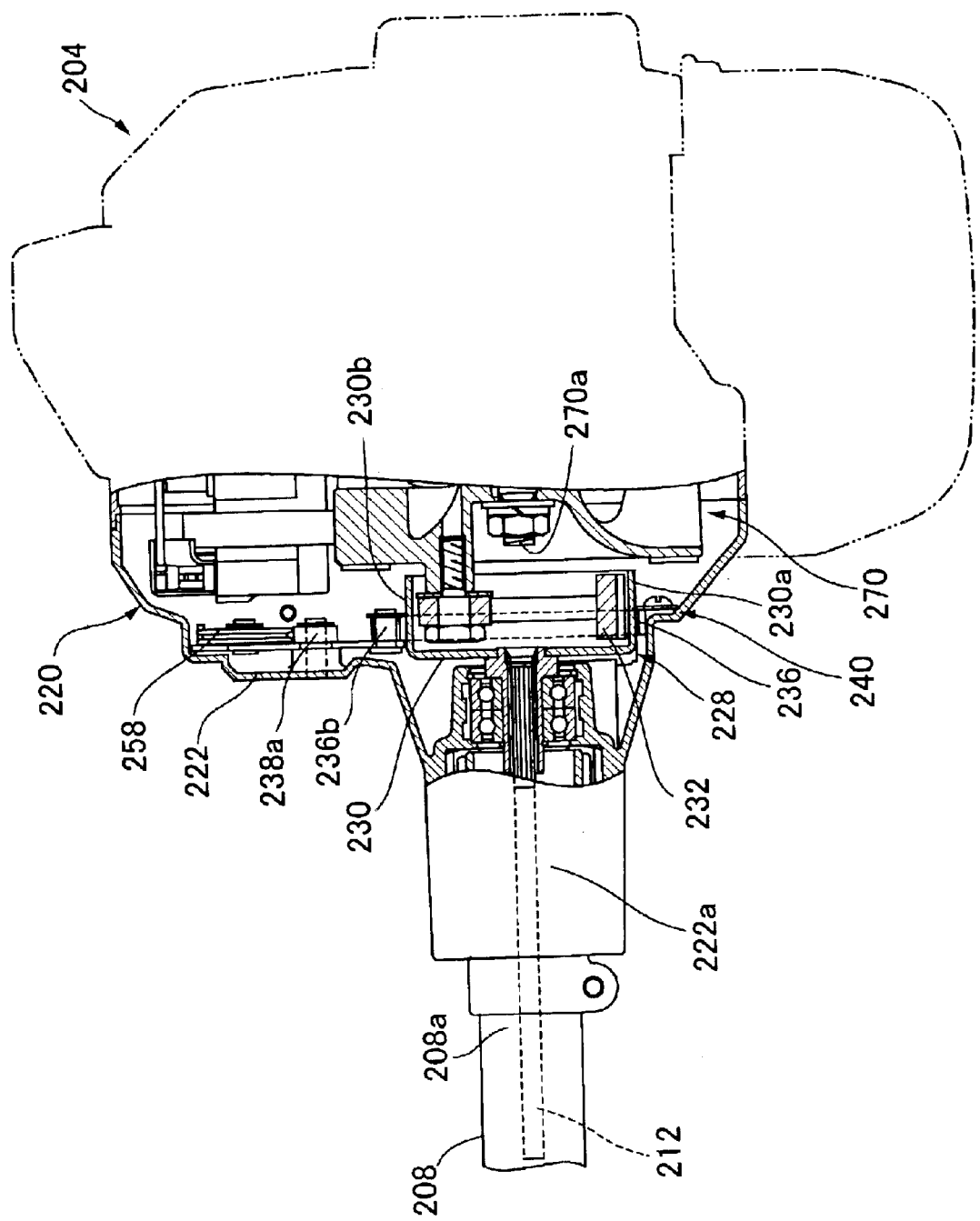
FIG. 8 is a fragmentary sectional view showing the power unit, taken along the line VIII—VIII in FIG. 7.

As seen in FIGS. 7 and 8, a centrifugal clutch 228 is provided between the engine 270 and the transfer shaft 212. The centrifugal clutch 228 includes a dish-shaped circular clutch drum 230 disposed coaxially with the transfer shaft 212, and a shoe member 232 adapted to be pressed onto the inner peripheral surface of the peripheral wall 230a of the clutch drum 230 according to a centrifugal force caused by the rotation of the crankshaft of the engine 270 so as to transfer the rotation of the clutch drum 230.

The power unit 204 is provided with the brake mechanism 234 for blocking the rotation of the clutch drum 230. The brake mechanism 234 comprises a brake band 28 disposed along the outer peripheral surface 230b of the clutch drum 230. The brake band 28 has a first end 28a engaged with the housing 220 of the engine 270, and a second end 28b connected to a swingable member 238 (described in detail later) which is an intermediate member pivoted to the housing 220. In response to the swing movement of the swingable member 238, the brake band 28 is moved between a braking position (see FIG. 7) where the brake band 28 is tightened to the outer peripheral surface 230b and a release position ( not shown) where the brake band is loosened.

The brake band 28 is disposed to surround the left, lower and right regions of the outer peripheral surface 230b of the clutch drum 230 except for the upper region of the outer peripheral surface 230b. As shown in FIG. 8, the lower region of the brake band 28 includes a movement limiter 240 for preventing disengagement of the brake band 28 from the outer peripheral surface 230b of the clutch drum 230 in the non-braking position. While not illustrated in detail, the movement limiter 240 includes a front limiter section integrally formed on the inner surface the fun cover 222, and a rear limiter section having a plate member detachably attached to the fun cover 222 with a fastening device. The front limiter section has a front surface opposed to the front edge of the brake band 28, and the plate member has a rear surface opposed to the rear edge of the brake band 28. The movement limiter 240 constructed as above can limit the movement of the brake band 28 otherwise causing its disengagement from the outer peripheral surface 230b.

As shown in FIG. 8, the rear end 208a of the operation rod 208 is received in and coupled with an insertion portion 222a protruding frontward from the fun cover 222, through an anti-vibration device.

The wire member 218 comprises a first wire (inner cable) 246 extending from the throttle control lever 216, and a second wire 248 extending from the carburetor 226. The first and second wires are connected together in the housing 220 through a coupling device 242. The coupling device 242 includes the swingable member 238, or the intermediate member, attached movable to the fun cover 222 in response to the movement (of the inner cable) of the wire member 218. The swingable member 238 is formed as a plate member to have an approximately sector-shaped upper portion and a rod-shaped lower portion, and generally a gingko-leaf-like shape. As seen in FIG. 8, a support shaft 238a is connected to the intermediate region between the upper and lower portions of the swingable member 238 to pivotally support the swingable member 238 to the inner surface of the fun cover 222 of the housing 220.

As best seen in FIG. 7, the swingable member 238 is swung on a plane parallel to the front surface of the fan cover 222. The end 246a of the first wire 246 is connected to a receiving portion 250 disposed in the sector-shaped upper portion of the swingable member 238 on the remote side from the carburetor 226. The first wire 246 is inserted into the inside of the housing through the hole 224 formed in the fun cover 222. The swingable member 238 is biased toward the initial (braking) position by a first tension spring 128.

A window 252 is formed in the fun cover 222 opposite to the receiving portion 250. As described in detail later, the window 252 makes it possible to check the receiving portion and/or insert a tool therethrough from the outside of the fun cover 222 so as to couple the first wire 246 with the receiving portion 250 of the swingable member 238 without detaching the front cover 222. The window 252 is a through hole formed in the housing. The window 252 has an elongated shape extending from the vicinity of the receiving portion 250 toward the hole 224. For example, during the coupling operation, the end 246a of the first wire 246 can be pinched with a tool or the like through the window 252.

Referring to FIG. 7, the trimmer 202 according to the third embodiment includes an idle-up control lever 254 for slightly opening the throttle valve of the carburetor 226 to facilitate initial start-up of the engine 270. The idle-up control lever 254 extends to the outside of the housing 220. The housing 220A also contains a second swingable arm member 256 to be swingably operated by the idle-up control lever 254.

As seem in FIG. 7, a pulley 258 is rotatably pivoted on the upper portion of the swingable member 238 on the side of the carburetor 226. The second wire 248 extends from the throttle valve of the carburetor 226 toward the pulley 258, and then turns around while surrounding the pulley 258 downwardly from its upper side or curves in a U-shape. Finally, the end 248a of the second wire 248 is connected to the upper end of the second swingable arm member 156.

Figure 9:
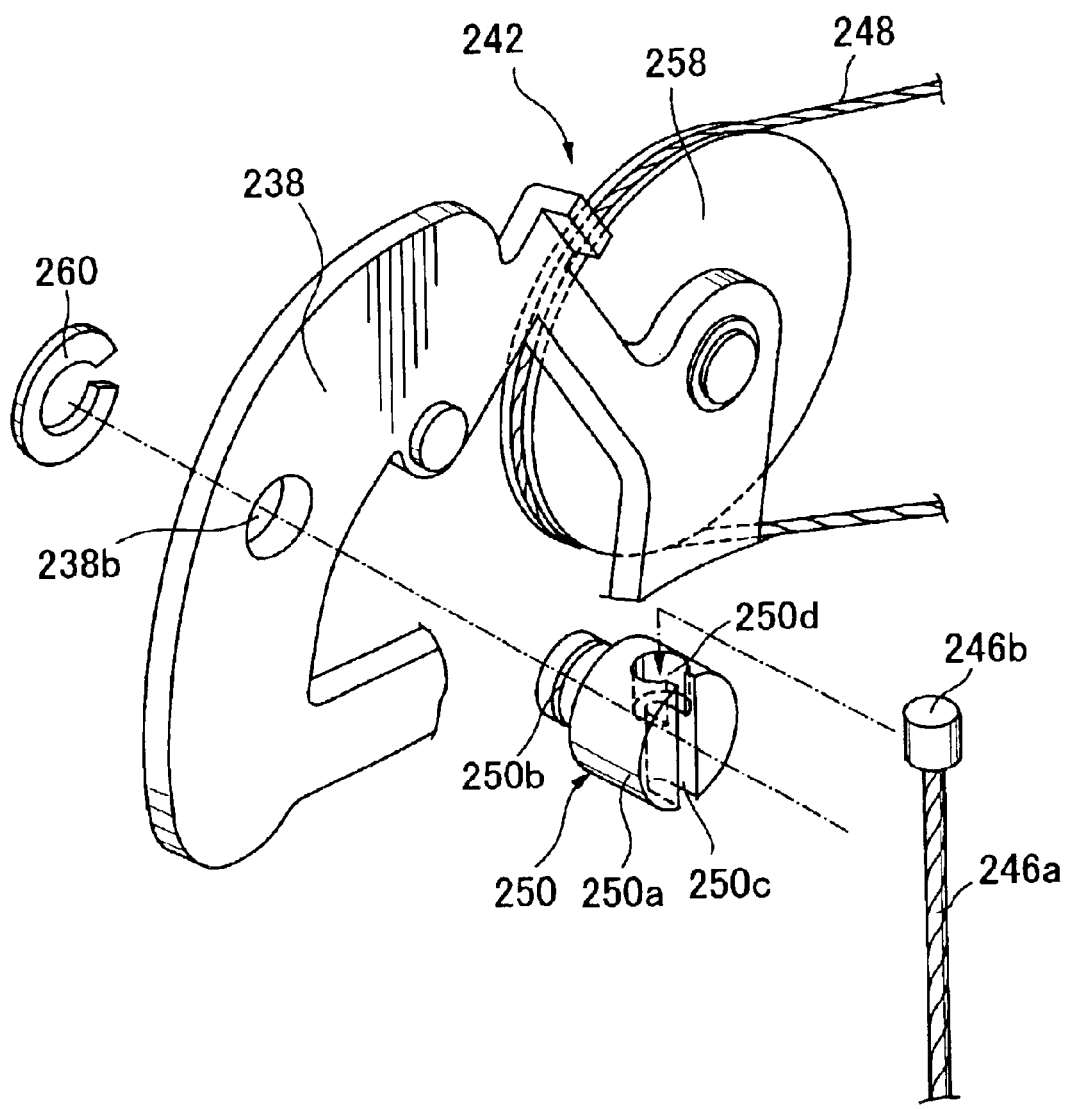
FIG. 9 is a detail view of a coupling device in FIGS. 7 and 8.

As already described, the coupling device 242 includes the swingable member 238 pivoted to the fun cover 222. On the front side relative to the swingable member 238, the swingable member 238 is provided with the receiving portion 250 for allowing the end 246a of the first wire 246 to be hooked thereto and coupled therewith. The receiving portion 250 includes a shank 250b disposed in parallel with the support shaft 238a of the swingable member 238, and a cylindrical main body 250a for allowing the end 246a of the first wire 246 to be coupled therewith. The receiving portion 250 is attached to the swingable member 238 by inserting the shank 250b of the receiving portion 250 into a hole 238b formed in the swingable member 238, and then rotatably retaining the shank 250b with a fastener 260 from the back side of the swingable member 238. As seen in FIG. 9, an enlarged terminal member 246b having a larger diameter than that of the first wire 246 is provided at the end 246a of the first wire 246. A groove 250c capable of receiving the first wire 246 therein is formed vertically in the front surface of the main body 250a of the receiving portion 250. The upper end of the groove 250d is formed with an enlarged groove for receiving therein an enlarged terminal member 246b of the first wire 246.

The power unit 204 and the operation rod 208 of the trimmer 202 according to the third embodiment as shown in FIG. 6 is assembled as follows.

The operation rod 208 having the cutter blade 206 attached thereto, and the power unit 204 are separately prepared, and delivered. An receiver of the trimmer inserts the rear end 208a of the rod 208 into the insertion portion 222a formed in the fun cover of the power unit 204, and connects them together in a conventional method.

Then, the end of the outer tube of the wire member 218 extending along the outside of the operation rod 208 is fixed to the hole 224 formed in the fun cover 222, and the end 246a of the first wire 246 is inserted from the hole 224 formed in the fun cover 222 to the vicinity of the receiving portion 250. Then, the enlarged end 246b of the first wire 246 is pinched with a tool or the like through the window 252, and hooked to the enlarged groove 250d while watching the inside of the window 252. Through this process, the end 246a is received in the groove 250c, and coupled with the swingable member 238 while keeping the first wire from dropping out downward.

The trimmer 202 according to the third embodiment is operated as follows.

In the initial (braking) position, the swingable member 238, the pulley 258 and the second swingable arm member 256 are located as shown in FIG. 7. Before initial start-up of the engine 270, the idle-up control lever 254 protruding from the housing 220 is pressed down and rotated. Thus, the second swingable arm 256 is swung, and the second wire 248 is slightly pulled to open the throttle valve from an idle position accordingly. In this state, the engine 270 is started using a recoil starter. When the throttle control lever 216 is operated, the swingable member 238 is swung from the initial position to the swing position through (the inner cable of) the wire member, and simultaneously the pulley 258 is moved from the position as shown in FIG. 7 in the direction getting away from the carburetor 226. In response to this movement, the throttle valve of the carburetor 226 is opened. After start-up, the idle-up control lever 254 may be manually moved in the reverse direction to release the idle-up operation.

According to the third embodiment, the wire member extending between the operation rod and the power unit can be readily connected together without detaching the housing of the power unit.

Further, according to the third embodiment, the window 252 is through hole having an elongated shape extending toward the first wire 246. Thus, during the coupling operation, the end 246a of the first wire 246 can be held with a tool through the window to facilitate the operation of coupling the end 246a with the receiving portion 250.

In addition, the movement limiter 240 provided in the fun cover 222 can prevent undesirable disengagement of the brake band 28.

The hole 224 for receiving the first wire 246 is formed in the fun cover 222 of the housing 220 closer to the operation rod 208. Thus, the play of the first wire 246 can be minimized between the operation rod 208 and the housing 220 to prevent the first wire from unintentionally hooking on trees or the like.

It is understood that the present invention is not limited to the above embodiments, but various modifications can be made without departing from the spirit and scope of the present invention. Therefore, it is intended that such modifications are also encompassed within the scope of the present invention.

In the first embodiment, a lining having a length approximately one third of the effective contact length of the brake band 28 is divided into three linings 38. While this structure is desirable in view of preventing abnormal noises, the present invention is not limited to such a structure, but as long as a plurality of linings are located spaced apart from each other, other factors, such as the total length, the number to be divided, the position in the longitudinal direction of the brake band 28, may be appropriately selected.

For example, while the distal-end-position adjusting device 132 in the second embodiment is composed of the second swingable means 132, any other suitable member capable of adjusting the position of the distal end 128b of the spring 128 may be used as the distal-end-position adjusting device 132. For example, it may be constructed to provide a linier motion according to the forward and rearward movements of the push screw 134.

While the edge 134a of the screw 134 in the second embodiment is in contact with the outer peripheral surface of the distal-end-position adjusting device 132, the edge of the screw 34 may be constructed to screw in the distal-end-position adjusting device 132.

What is claimed is:

1. A portable trimmer comprising:
    an internal combustion engine, said internal combustion engine having a crankshaft;
    a centrifugal clutch for transferring a rotation of said crankshaft and having a clutch drum, said clutch drum having an outer peripheral surface;
    an output shaft extending frontward from said centrifugal clutch;
    a gear case;
    a cutting blade connected to said output shaft through said gear case; and
    a brake mechanism for braking said clutch drum, said brake mechanism having a brake band having ends and an inner surface and formed in a curved strip shape extending along said outer peripheral surface of said clutch drum, said brake band being accepted to be tightened around or released from said outer peripheral surface in response to a movement of at least one of said ends, said brake band including a plurality of linings provided on said inner surface and to be opposed to said outer peripheral surface of said clutch drum, said linings being located spaced apart from each other along a longitudinal direction of said brake band;
    said brake mechanism including means for releasing said brake band and means for adjusting a tightening force of said brake band against said clutch drum;
    said releasing means having a brake control lever, a spring and a first swingable member which swings between an initial position and a swing position, said first swingable member being biased toward said initial position by said spring which has a proximal end connected thereto, and adapted to be moved to its swing position by said brake control lever, said first swingable member being connected to one of said ends of said brake band in such manner that said brake band is tightened to said clutch drum when said first swingable member is in said initial position, and loosened when said first swingable member is in said swing position; and
    said adjusting means having a distal-end-position adjusting member connected with a distal end of said spring located on an opposite side of said proximal end attached to said first swingable member, and a screw for moving said distal-end-position adjusting member in a direction to increase or reduce tension of said spring.

2. The portable trimmer as defined in claim 1, wherein said distal-end-position adjusting member is a second swingable member, said second swingable member having first and second arm portions, each extending from a pivot axis thereof, and wherein an edge of said screw acts on said first arm portion, said distal end of said spring is connected to said second arm portion, and a distance between said pivot axis and an acting point of said screw is shorter than a distance between said pivot axis and a position where said spring is connected to said second arm portion.

3. The portable trimmer as defined in claim 1, wherein said edge of said screw is in contact with said first arm portion at said acting point, and said second swingable member has an arc-shaped surface to be in contact with said edge of said screw during a swing movement of said second swingable member.

4. The portable trimmer as defined in claim 1, wherein said internal combustion engine has a carburetor, and further comprising:
    a housing accommodating said internal combustion engine and said brake mechanism,
    an operation rod having said output shaft therein,
    a throttle control lever connected to said first swingable member,
    a wire member extending from said throttle control lever along an out side of said operation rod to said carburetor through a hole formed in said housing, said wire member having a first wire extending from said throttle control lever and a second wire expending from said carburetor, coupling means for coupling said first wire with said second wire, said coupling means having an intermediate member attached to said housing in such manner that it is movable in conjunction with a movement of said wire member caused by an operation of said throttle control lever, said intermediate member operationally connected with an end of said second wire portion, said intermediate member being provided with a receiving portion for allowing one end of said first wire to be hooked thereto and coupled therewith, and said housing has a window formed therein to allow said end of said first wire to be coupled with said receiving portion from the outside of said housing.

5. The portable trimmer as defined in claim 4, wherein said window is a through hole formed in said housing and said through hole has an elongated shape extending from the vicinity of said receiving portion toward said hole.

* * * * *